(12) United States Patent
Macedo et al.

(10) Patent No.: US 9,527,264 B2
(45) Date of Patent: Dec. 27, 2016

(54) METHODS FOR PREPARING THERMOFUSED LAMINATES

(71) Applicants: Joseph Macedo, Basking Ridge, NJ (US); Millie Graves, New York, NY (US)

(72) Inventors: Joseph Macedo, Basking Ridge, NJ (US); Millie Graves, New York, NY (US)

(*) Notice: Subject to any disclaimer, the term of this patent is extended or adjusted under 35 U.S.C. 154(b) by 0 days.

(21) Appl. No.: 14/226,694

(22) Filed: Mar. 26, 2014

(65) Prior Publication Data

US 2014/0295190 A1 Oct. 2, 2014

Related U.S. Application Data

(60) Provisional application No. 61/806,547, filed on Mar. 29, 2013.

(51) Int. Cl.
*B32B 21/10* (2006.01)
*B32B 38/08* (2006.01)
(Continued)

(52) U.S. Cl.
CPC .............. *B32B 21/10* (2013.01); *B32B 38/08* (2013.01); *B32B 37/1027* (2013.01); *B32B 38/145* (2013.01); *B32B 2038/166* (2013.01); *B32B 2250/02* (2013.01); *B32B 2250/03* (2013.01); *B32B 2255/08* (2013.01); *B32B 2260/021* (2013.01); *B32B 2260/026* (2013.01); *B32B 2262/065* (2013.01); *B32B 2307/30* (2013.01);
(Continued)

(58) Field of Classification Search
CPC .. B32B 9/042; B32B 2255/08; B32B 2250/02; B32B 2260/023; B32B 2260/026; B32B 2262/06; B32B 2262/062; B32B 2262/065; B32B 2262/067; B32B 2262/08; B32B 2260/021
USPC ............ 428/195.1, 481, 297.1, 297.4, 297.7; 503/227
See application file for complete search history.

(56) References Cited

U.S. PATENT DOCUMENTS 4,253,838 A * 3/1981 Mizuno ................ B41M 5/0356
428/913
6,300,279 B1 10/2001 Macedo
(Continued)

FOREIGN PATENT DOCUMENTS

GB 1006399 * 7/1963

*Primary Examiner* — Jennifer Chriss
*Assistant Examiner* — Camie Thompson
(74) *Attorney, Agent, or Firm* — White & Case LLP

(57) ABSTRACT

A backer sheet comprising a natural fiber and impregnated with a water-based acrylate resin is thermofused with a wood cellulose sheet impregnated with the same or different water-based acrylate resin to provide a continuous laminate. The acrylate resin diffuses into the pores of the natural fiber backer sheet and the wood cellulose sheet during impregnation. Heat and pressure are used to thermofuse the backer sheet and the wood cellulose sheet to form the laminate, and the sheets are permanently bonded after thermofusion. Advantageously, the thermofused laminate is free of volatile organic compounds and formaldehyde emissions. A topcoat or an iron oxide layer can be applied to the wood cellulose sheet after impregnating the wood cellulose sheet with the acrylate resin. A design can be transferred to the surface of the laminate or sheets using techniques such as dye sublimation or direct printing.

14 Claims, 1 Drawing Sheet

(51) Int. Cl.
*B32B 38/00* (2006.01)
*B32B 37/10* (2006.01)
*B32B 38/16* (2006.01)

(52) U.S. Cl.
CPC ...... *B32B 2307/558* (2013.01); *B32B 2309/02* (2013.01); *B32B 2309/04* (2013.01); *B32B 2309/12* (2013.01); *B32B 2317/16* (2013.01); *B32B 2333/04* (2013.01); *B32B 2479/00* (2013.01); *B32B 2607/00* (2013.01); *Y10T 428/3179* (2015.04); *Y10T 428/31576* (2015.04); *Y10T 428/31906* (2015.04)

(56) References Cited

U.S. PATENT DOCUMENTS

| | | | |
|---|---|---|---|
| 6,325,884 B1* | 12/2001 | Karam | 156/278 |
| 6,596,116 B2 | 7/2003 | Macedo | |
| 6,780,512 B2 | 8/2004 | Macedo | |
| 8,017,180 B2 | 9/2011 | Macedo | |
| 2002/0043327 A1* | 4/2002 | Macedo | 156/230 |
| 2008/0229962 A1* | 9/2008 | Shedd et al. | 101/487 |
| 2009/0246466 A1* | 10/2009 | Macedo | 428/142 |

* cited by examiner

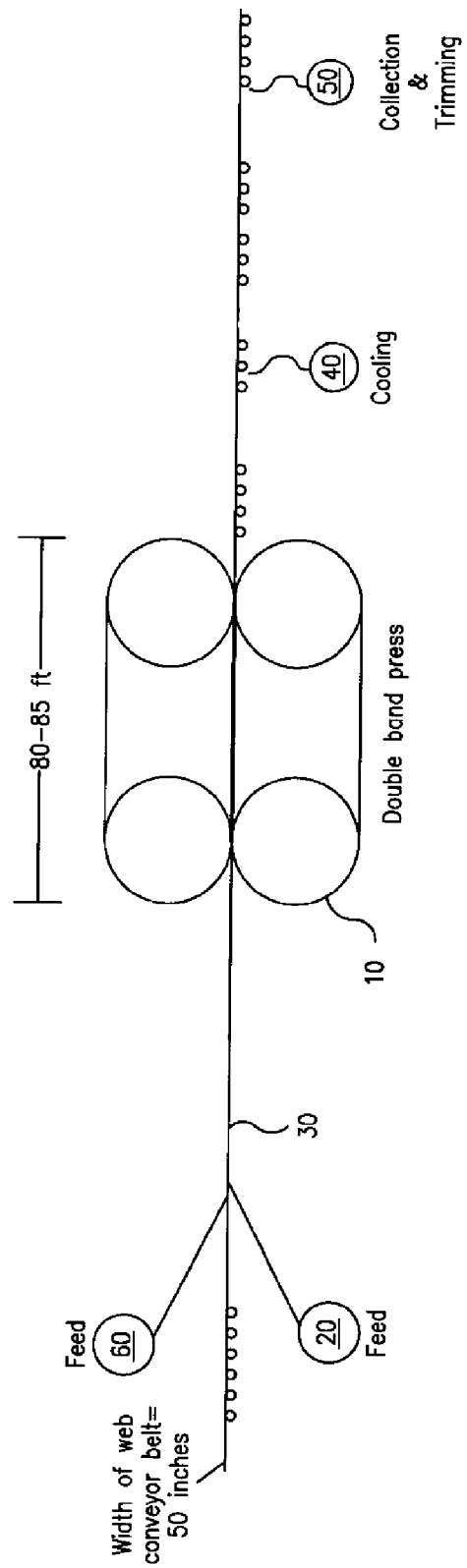

METHODS FOR PREPARING THERMOFUSED LAMINATES

This application claims the priority benefit of U.S. provisional patent application Ser. No. 61/806,547, filed on Mar. 29, 2013, the contents of which are incorporated by reference herein in their entirety.

FIELD OF THE INVENTION

The present invention is directed to the field of environmentally sustainable thermofused laminates that are free of formaldehyde, phenolic materials and solvents; methods of preparing the thermofused laminates; and applications for such thermofused laminates.

BACKGROUND OF THE INVENTION

Decorated substrates such as walls, ceilings, countertops, and furniture are widely used for commercial and residential applications. An example of a method of applying decorative design to substrates is the use of sublimation dyes. This method of decorating involves printing a design on a transfer sheet using sublimation dyes, and transferring the design from the transfer sheet to the substrate by the application of heat and pressure.

In the thermofusion process of manufacturing laminates, decorative sheets are saturated with reactive resins, which are partially cured at the point of manufacture. Final curing is done at the time of hot press lamination, when the resin forms a hard cross-linked thermoset material. These products are self-bonding, that is, the resin in the decorative sheet flows into the surface of the substrate during the lamination to form a permanent bond.

Two different resin systems are presently used to impregnate substrates with resin for use during lamination. In the first system known as thermofused melamine (TFM), melamine is introduced into the substrate during an impregnation process. After the substrate is impregnated, it is partially cured in a curing oven. The melamine resin is fully cured at 300-400 psi and 300-400° F. during hot press lamination. A drawback to this process is that the resultant melamine-impregnated substrate has a finite shelf life that decreases with increased temperature and humidity.

The second resin system employs a polyester resin known as thermofused polyester (TFP), which is similarly introduced into the substrate during an impregnation operation. The substrate is heavily impregnated with polyester resin in a dip tank and then partially cured at 140 psi and 300-370° F. during the press lamination step.

The TFM manufacturing processes and resultant thermofused products can have disadvantageous properties. For example, products containing thermofused melamine such as melamine phenolic resins are disadvantageous at least from an environmental standpoint.

Water-based acrylate resins have been typically used to impregnate a single layer of a fibrous substrate, for example, the manufacturing of interior side panels for automotive parts that are then wrapped with leather or vinyl. However, it has not been previously known to bond at least two plies of a natural material using water-based synthetic resins such as acrylate resins to obtain continuous backer sheet thermofused laminates.

There is, therefore, an unmet demand for methods of preparing continuous thermofused backer sheet laminates which have little or no volatile organic content (VOC) and which do not release formaldehyde, and which have the performance attributes of TFM and TFP.

BRIEF DESCRIPTION OF THE INVENTION

The present invention is intended to address solutions associated with preparation of continuous thermofused laminated materials having the performance attributes of existing laminates but without the environmental drawbacks, which have little or no VOC content, and which provide high quality and cost-effective surface protection options.

One aspect of the present invention is directed to a thermofused laminate made by thermofusing (a) a backer sheet comprising natural fiber impregnated with a water-based acrylate resin, and (b) a wood based cellulose sheet impregnated with the same or different water-based acrylate resin. During lamination, the acrylate resin diffuses into the pores of the backer sheet and the wood cellulose sheet to bond the two plies together. The thermofused laminate is free of volatile organic compounds and formaldehyde emissions.

The backer sheet and the wood cellulose sheets can be impregnated with the same resin, or the backer sheet and the wood cellulose sheets can each be impregnated with a different resin. Examples of natural fibers include hemp, jute, kenaf, and flax. Exemplary manufacturers of backer sheets suitable for use in the invention are FlexForm Technologies (Elkhart, Ind.) and BASF Corporation (Germany), and exemplary manufacturers of wood cellulose web sheets include Neenah Paper (Neenah, Wis.) and Ahlstrom (Finland). In an embodiment of the invention, the wood cellulose sheets are FSC Certified, that is, certified by the Forest Stewardship Council as meeting their requirements for having been sourced in an environmentally-friendly, socially responsible and economically viable manner. For convenience, the resin may be referred to as a synthetic resin, and unless otherwise qualified, the term "resin" or "synthetic resin" are to be understood as encompassing a water-based acrylate resin in accordance with the invention. An example of a suitable water-based acrylate resin which is free of formaldehyde is Acrodur®, a product of BASF® Corporation.

In an embodiment of the invention, the laminate may have an optional top coat or an additional treatment. Examples of topcoats or treatments include a polyurethane reactive (PUR) acrylic topcoat, a polyester topcoat, a polyethylene terephthalate (PET) topcoat, an iron oxide layer, and combinations thereof. The topcoats can be applied directly to the laminate as a separate step after thermofusion. Alternatively, the topcoat may be applied to the backer sheet, the wood cellulose sheet, or both after impregnation with the acrylate resin and before thermofusion. In the latter case, after thermofusion, the resultant thermofused laminate will have the desired topcoat. An example of a manufacturer of such topcoat materials is Kleiberit (Waxhaw, N.C.). The iron oxide layer can be applied to the impregnated backer sheet or wood cellulose sheet using any convenient method of application. For example, commercial grade iron oxide can be mixed with water and then roll-coated onto a wood cellulose sheet which had been previously impregnated with the acrylate resin. The resultant sheet can then be thermofused with the backer sheet to form the desired laminate, which may further be topcoated as discussed above.

In an embodiment of the invention, the backer sheet has at least about a 55% natural fiber content and the wood cellulose sheet has at least about a 55% wood cellulose content. In other embodiments, the backer sheet has about a 100% natural fiber content, and the wood cellulose sheet has about a 70% wood cellulose content or about a 100% wood cellulose content. In another embodiment of the invention, the natural fiber sheet does not contain any wood or wood cellulose. The resin used for impregnating the backer sheet and wood cellulose sheet can be the same or different.

Another aspect of the invention is directed to a process for making a thermofused laminate. The process comprises (a) impregnating a natural fiber backer sheet and a wood cellulose sheet with a synthetic acrylate resin; (b) combining the backer sheet and the wood cellulose sheet; and (c) thermofusing the backer sheet and the wood cellulose sheet by applying heat and pressure to form the laminate.

The temperature and pressure applied during thermofusion will depend on the particular characteristics of the resin and the thickness of the substrate sheets, but a useful temperature range is from about 200° F. to about 400° F., and a useful pressure range is from about 50 psi to about 200 psi. The duration of thermofusion will depend on the particular resin and substrate and may be, for example, about 30 seconds to about 60 seconds.

The resultant laminate is manufactured with eco-sustainable and renewable materials, and is resistant to mold, fire, moisture, thermal and UV degradation, and abrasion. The individual component impregnated backer sheets and wood cellulose sheets are stable indefinitely at ordinary storage conditions.

The inventive thermofused sheet laminate can optionally be decorated or coated after thermofusion using known techniques, for example, using dye sublimation or direct printing to transfer a design to the surface of the thermofused sheet laminate. For example, the surface of the cellulose sheet, with or without any design, can be protected with topcoats or coatings as discussed above, such as a polyurethane reactive (PUR) top coating that provides a high quality and cost-effective surface finish to the decorated laminate. The polyurethane reactive system technology provides surface protection with high wear and shock resistance and maintains the depth and quality of the printed design. A latex-based iron oxide layer applied to the wood cellulose sheet before thermofusion provides a resultant laminate which can be used for affixing magnetic items such as business cards, magnetic frames, and art panels.

Without being bound by theory, it is believed that the lamination process crosslinks the synthetic resin to the wood cellulose sheet and the natural fiber backer sheet, and that the resin diffuses into the pores of the substrate(s) to form a rigid, sheet laminate. In one embodiment of the invention, the resin is phenolic-free.

The inventive laminate can be adhered to a myriad of substrates, such as drywall, engineered wood, and composite panels using glue or other fasteners for subsequent use or installation. The color of the resultant laminate will be influenced by the colors of the resin and component sheets. In one embodiment, the laminate has a beige color, although the acrylate resin or component sheets can optionally contain pigments so that the resultant laminate has a particular color or tint. Other aspects and advantages of the invention will be apparent from the description below.

BRIEF DESCRIPTION OF THE FIGURE

FIG. 1 is a schematic drawing illustrating a process for the preparation of a continuous laminate prepared by thermofusing a resin-saturated natural fiber backer sheet to a wood cellulose sheet in accordance with one embodiment of the present invention.

DETAILED DESCRIPTION OF THE INVENTION

The natural fiber backer sheet and the wood cellulose sheet used with the present invention can have varied compositions. In one embodiment, the backer sheet is composed of about 100% natural fibers and is optionally free of wood or wood cellulose. The wood cellulose sheet may be composed of wood cellulose fibers in combination with other materials such as synthetic binders and may have a wood or wood cellulose content of less than 100%. In other embodiments, the backer sheet may have less than 100% natural fiber, with the non-natural fiber content consisting of synthetic materials which facilitate preparation of the laminate by providing stiffness or binding. A practical composition range for the natural fiber content in the backer sheet and the wood cellulose content in the wood cellulose sheet is in the range from about 55% to about 85%, with the remainder consisting of binders, fillers, synthetic materials, or other substances which do not degrade the performance of the respective sheet.

The backer sheets and the wood cellulose sheets have the appearance of textured, non-calendared paper. This texture allows for the resins to penetrate the sheets and to provide for a strong laminate. In one embodiment, the backer sheet has a thickness of about 15 mm and comprises about 100% natural fiber such as bast fiber, e.g., jute, hemp, flax, or combinations of these or other natural fibers. In another embodiment of the invention, the backer sheet consists of about 70% natural fiber such as hemp, jute, or flax, and does not contain wood or wood cellulose. In an embodiment of the invention, the wood cellulose sheet is about 6 mil thick and comprises about 70% wood cellulose and about 30% synthetic fibers such as polyester fibers.

In an embodiment of the invention, the resin is a water-based acrylate binding resin that is free of formaldehyde and non-aqueous solvents. In such embodiments, the thermal cross-linking and curing of the acrylate resin will generate water as the sole by-product, thereby providing an environmentally friendly manufacturing process which does not involve VOC's.

The backer sheets and the wood cellulose sheets can be impregnated with the same or different water-based synthetic acrylate resins, depending on the desired qualities of the resultant laminate. In certain embodiments, it may be desirable to combine or blend two or more kinds of acrylate resins to obtain a resultant resin for impregnation having particularly advantageous properties. For example, two or more commercial grades of acrylate resins can be mixed to fine-tune the properties of the laminate. Alternatively, the backer sheets and/or the wood cellulose sheets can be pre-impregnated with a first acrylate resin, and then impregnated with a second kind of acrylate resin. The amount of resin to be applied to the backer sheet and wood cellulose sheets will depend on the properties to be imparted to the resultant laminate, and such information will be typically provided by the supplier of the resin. Generally, greater amounts of resin applied to the plies, or greater amounts of cross-linkers in the resin, will provide for more rigid and less flexible laminates. The resin can also be applied to the individual sheets and partially cured before thermofusion, for example, to reduce the moisture content of the impregnated sheets to a desired level.

The present invention will now be described with reference to the embodiment illustrated in FIG. 1. FIG. 1 illustrates preparation of a backer sheet laminate using a double band press (10) to apply heat and pressure to bring about thermofusion of a resin-saturated natural fiber backer sheet to a wood cellulose sheet.

Pursuant to the invention, a natural fiber backer sheet (20) is placed on a web conveyor belt (30), and the backer sheet extends across the surface of the web conveyor belt (30). The wood cellulose sheet (60) has been previously wound around a feed reel. Both the backer sheet and the wood cellulose sheets have been previously impregnated with a water-based acrylate resin, and these sheets have already been dried and partially cured in an oven to a residual moisture level of about 12%. During the operation of the conveyer belt (30), the partially cured wood cellulose sheet and the natural fiber backer sheet are fed together to the heat press (10). This is a roll to panel process. The particular manufacturing procedure used to prepare the laminate will vary depending on the materials and the particular manufacturing equipment used, and will be evident to those of skill in the art.

The heat and pressure to which the component sheets are exposed for thermofusion will vary depending on the particular characteristics of the resin, which will typically be provided by the resin manufacturer. A convenient temperature range for thermofusion may be from about 200° F. to about 400° F., and pressures used may range from about 50 psi to about 200 psi. The application of heat and pressure into the double band press (10) causes the resin to seep into the pores of the backer sheet and the wood cellulose sheet to form a thermofused backer sheet laminate.

The velocity of the web conveyer (30) may be decreased or increased in order to increase or decrease, respectively, the time during which the backer and wood cellulose sheets are exposed to heat and pressure in the double banded press (10). For example, in the case of BASF Acrodur® 950L as the water-based acrylate resin, an exemplary temperature-pressure-time combination is a temperature of about 400° F., a pressure of approximately 150 psi, and an exposure time of approximately 20 seconds. After the sheet laminate is thermofused, it is cooled (40) and then collected and trimmed (50) as desired. The sheet laminate can have any resultant thickness or dimensions after thermofusion, and a practical thickness may be in the range of from about ⅛ inch to about ½ inch (about 3 mm to about 12 mm).

In the embodiment illustrated in FIG. 1, the velocity of the web conveyor belt (30) can be adjusted to provide the desired exposure time. One manufacturer of double band presses is Hymmen GmbH (Germany). The invention is not limited to the use of double band presses, and rotary or drum heat transfer presses or other kinds of presses can be used as alternatives to double band presses. As an advantage, the resultant thermofused laminate does not have a visible glue line or seam between the layers, which would affect the appearance or strength of the laminate.

As previously discussed, the resins used in the laminate are introduced into the backer sheets and the wood cellulose sheets during the impregnation process. For example, the backer sheet and wood cellulose sheet can be saturated by and impregnated with the resin using a dip tank or by spraying the resin onto the sheets. In one embodiment, the resin can be diluted with a solvent such as water to a concentration of about 23% before impregnation. After impregnation, the separate backer sheet and the wood cellulose sheets are dried in an oven to partly cure the resin and to reduce the moisture content to about 12%.

The water-based acrylate resin used in the invention can be purchased commercially or prepared from commercially available materials. An example of a commercially available acrylate resin is BASF Acrodur® 950L, which is an aqueous one-component binder system consisting of a polyacrylic acid-maleic anhydride copolymer and a polyalcohol cross-linker, which cross-links during the thermal curing step. Alternatively, the acrylate resin can be prepared by reacting di-functional carboxylic acids with di-functional alcohols under suitable reaction conditions, which may include heating these materials in a cauldron to obtain the desired acid number and viscosity. The concentration of the aqueous acrylate resin can be adjusted if necessary to obtain the desired properties. Those of skill in the art will understand how to select appropriate temperature, pressure, and lamination time conditions for use in preparing the desired thermofused sheet laminate.

The thermofused sheet laminates can be stocked and bonded to various substrates on demand to be used on panels for, i.e. walls, ceilings, furniture. Examples of suitable substrates include natural fiber panels, engineered woods, composite materials, and magnetic walls/panel systems.

The invention is equally capable of manufacturing laminates having more than two plies, for example, with two layers of wood cellulose sheets and one layer of a backer sheet. In such instances, each of the three plies is impregnated with the synthetic resin and thermofused in accordance with the principles of the invention discussed above. The plies can also be coated with a topcoat or have an iron oxide layer as discussed above.

Other objects, advantages and embodiments of the various aspects of the present invention will be apparent to those who are skilled in the field of the invention and are within the scope of the description and the accompanying Figure. For example, but without limitation, structural or functional elements might be rearranged, or method steps reordered, consistent with the present invention. Similarly, a machine may comprise a single instance or a plurality of machines, such plurality possibly encompassing multiple types of machines, which together provide the indicated function. The machine types described in various embodiments are not meant to limit the possible types of machines or instruments that may be used in embodiments of aspects of the present invention, and other devices that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed is:

1. A thermofused laminate comprising:
   a. a backer sheet which is free of wood and wood cellulose and which comprises a natural fiber impregnated with a water-based acrylate resin, and
   b. a wood cellulose sheet impregnated with the same or different water-based acrylate resin, wherein:
      the resin is diffused into the pores of the natural fiber backer sheet and the wood cellulose sheet,
      the backer sheet and wood cellulose sheet are permanently bonded to each other after thermofusion, and
      the thermofused laminate is free of volatile organic compounds and formaldehyde emissions.

2. The laminate according to claim 1, wherein the backer sheet has at least about a 55% natural fiber content and the wood cellulose sheet has at least about a 55% wood or wood cellulose content.

3. The laminate according to claim 1, further comprising an optional polyurethane reactive acrylic topcoat, a polyester topcoat, a polyethylene terephthalate (PET) topcoat, an iron oxide layer, or a combination thereof.

4. The laminate according to claim 1, wherein the natural fiber is a bast fiber selected from the group consisting of hemp, jute, kenaf, and combinations thereof.

5. A process for making the thermofused laminate of claim 1, the process comprising the steps of:
   a. impregnating each of the backer sheet and the wood cellulose sheet with the acrylate resin;
   b. combining the backer sheet and the wood cellulose sheet; and
   c. thermofusing the backer sheet and the wood cellulose sheet by applying heat and pressure to form the laminate.

6. The process according to claim 5, wherein the temperature applied is in the range of about 200° F. to about 400° F.

7. The process according to claim 5, wherein the pressure applied is in the range of from about 50 psi to about 200 psi.

8. The process according to claim 5, wherein the resin is free of formaldehyde.

9. The process according to claim 5, further comprising the step of:
   applying a polyurethane reactive (PUR) acrylic topcoat, a polyester topcoat, a polyethylene terephthalate (PET) topcoat, or an iron oxide layer to the wood cellulose sheet or the backer sheet after impregnation with the acrylate resin.

10. The process according to claim 5, further comprising the step of:
    applying a design to the thermofused laminate by direct printing or dye sublimation.

11. The process according to claim 5, wherein the resin is a water-based acrylate resin.

12. The process according to claim 5, wherein the backer sheet and the wood cellulose sheet are each impregnated with the same resin or with different resins.

13. The process according to claim 5, wherein the backer sheet is free of wood and wood cellulose.

14. The process according to claim 5, wherein the backer sheet comprises a bast fiber selected from the group consisting of hemp, jute, kenaf, and combinations thereof.

* * * * *